March 8, 1949. M. PARTIOT 2,463,713
WHEELED TRAVELING BAG
Filed Feb. 25, 1947
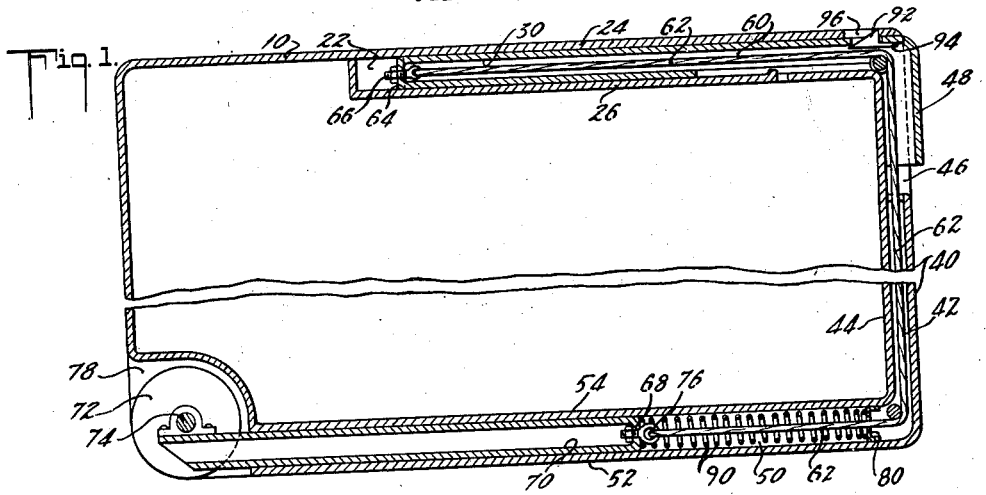
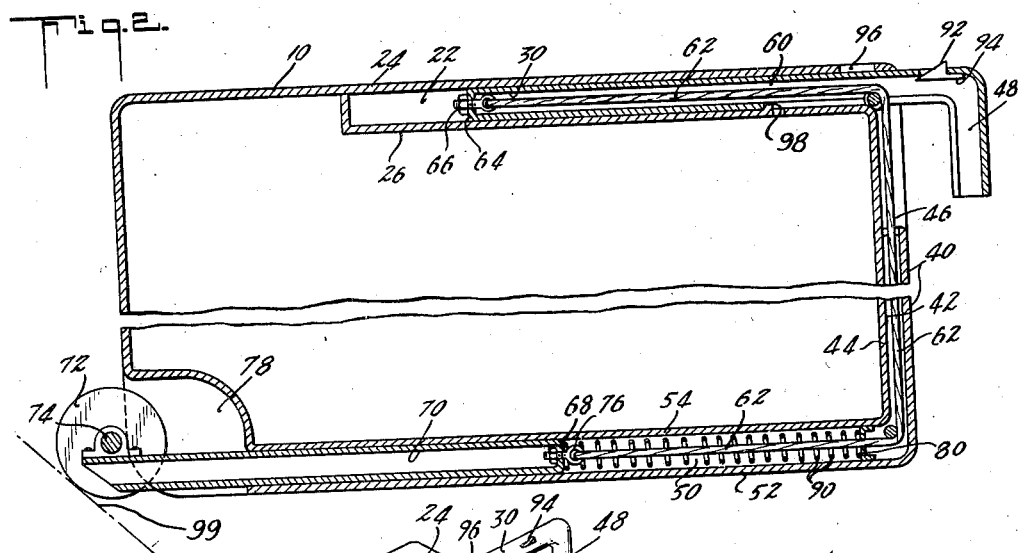
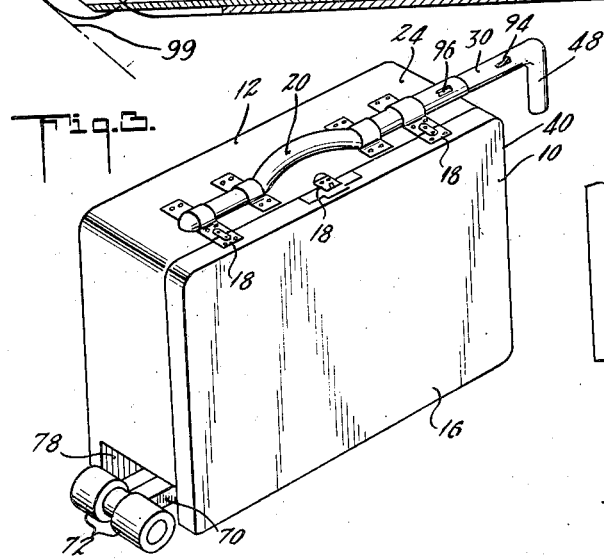
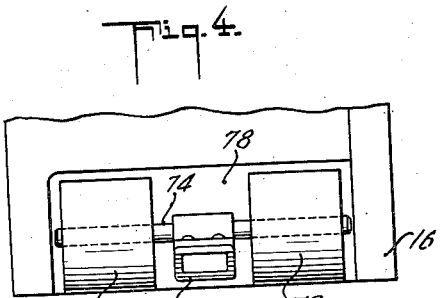
INVENTOR
MAURICE PARTIOT
BY Schames and Liberman
ATTORNEYS Patented Mar. 8, 1949

2,463,713

UNITED STATES PATENT OFFICE 2,463,713

WHEELED TRAVELING BAG

Maurice Partiot, New York, N. Y.

Application February 25, 1947, Serial No. 730,813

6 Claims. (Cl. 280—37)

My invention relates generally to containers as valises, suitcases, handbags, travelling bags and the like. Specifically, my invention relates to containers having built-in supporting means, whereby the device may be rolled or slid along the ground rather than carried by hand above the ground. In the following description of an illustrative embodiment of my invention, I use the term "valise" to indicate any suitable container such as above described.

The main object of my invention is the provision of a valise or the like, having built-in supporting means, in combination with means to retain the support means within a suitable recess in the valise, and having means to extend the support means from within the valise into operative position, the last named means comprising a handle member.

Another object of my invention is the provision of a valise or the like, having a recess at one end thereof and a recess at the diagonally opposite end thereof, one recess having supporting means disposed therewithin, the other recess having a handle member disposed therewithin, the device including means to retain the supporting means and the handle within their respective recesses in the valise, and a connection between the supporting means and the handle whereby upon release of the handle from within its recess, the supporting means is automatically extended from its recess into operative position.

Another object of my invention is the provision of a valise or the like having socketed recesses at diagonally opposite ends thereof, a connecting passageway therebetween, roller supporting means in one recess, a handle in the other recess, a connection between the two recesses, and spring means associated with the roller supporting means, against the normal tensioning of which spring means both the handle and the roller support means are disposable and securable within their respective recesses, and upon release of which spring means the handle and the support means are extended from their recesses into operative position.

Other and further objects of my invention will in part be pointed out specifically hereinbelow, and still others will be obvious from the following description of an illustrative embodiment thereof.

In the drawings annexed hereto, forming a part hereof,

Figure 1 is a vertical section through one form of device constructed according to and embodying my invention, showing the supporting means and the handle in retracted position within the device;

Fig. 2 is a similar section showing the parts in extended, operative position;

Fig. 3 is a perspective view of a modified form of valise also constructed according to my invention showing the handle and supporting means in extended position, as in Fig. 2; and Figure 4 is an elevational view of the roller and shaft assembly as seen from the front end of the device, as in Fig. 3.

The device of my invention indicated generally by reference numeral 10, may comprise a generally rectangular casing having a body portion as 12 and a cover portion as 16. The cover portion 16 may be hinged to the body at one side, and securable to the body at the other side thereof as by means of suitable clasps or locks 18, 18. A handle or bail member 20 may be provided at the top of the valise, secured to body 12 by conventional means.

An elongated, socketed recess 22 is provided in body 12 at the top thereof, extending lengthwisely of the valise, the socket being defined by the outer upper wall 24 and a wall member 26 spaced inwardly therefrom. Socket-recess 22 need not extend the full length of the valise, but may be just long enough to receive the handle body 30 of my device therewithin. An adjacent side 40 of the valise is provided with an interior passageway 42, in communication with recess 22, the passageway 42 being defined by a wall member 44 spaced inwardly of the outer wall 40. A recess 46 is provided on side 40 to receive therewithin the hand grip component 48 of handle 30, permitting same to be substantially flush with sidewall 40 when the handle is in the "in" position of Fig. 1.

Another socketed recess 50 is provided on the bottom of the body portion 12, opening outwardly at the diametrically opposite side of the valise from recess 46, socket recess 50 being defined by outer wall 52 and an inner wall member 54 spaced inwardly therefrom. Recess 50, as shown, extends the full length of the valise, and is in communication with passageway 42, and also of course socket 22.

Handle 30 comprises a body portion 60 normally extending into socket 22, and a hand grip portion 48 at right angles thereto, extending downwardly therefrom. Handle 30 may be formed of any rigid material, as wood, metal, plastic, or the like, and is preferably hollow to permit a cable 62 to be anchored to the inner terminus 64 thereof, as at 66. Cable 62 may be of metal wire, fiber rope or the like, the desiderata being flexibility. The cable must be of length sufficient to extend from handle end 64 to the inner end 68 of the support rod 70, passing through socket 22 within hollow handle body 60, passageway 42 and socket recess 50.

Support rod 70 preferably is also formed of rigid material, as metal, wood or the like. At its outer end, I may secure a pair of rollers 72 on a shaft 74 extending transversely through rod 70. At the inner end 68 of support rod 70, I anchor the other end of cable 62, as at 76. Valise body 12 is recessed, as at 78, to receive therewithin rollers 72, 72 when the valise is to be carried in the hand rather than rolled on the ground (see Fig. 1). A centrally apertured plate 80 through which cable 62 passes is disposed within passageway 50 and fixed therewithin near sidewall 40. Between this fixed plate 80 and the inner end 68 of rod 70, I dispose a heavy expanding coil spring 90, the purpose of which will be amplified below.

I provide means to dispose and retain both the support means (rod 70 and rollers 72) and the handle 30 within their respective recesses 22, 46—78, by means of a lock or catch located adjacent the handle end. As illustrated in Figs. 1 and 2, I provide and mount a catch 92 on a spring leaf 94 within hollow handle body 60, which spring 94 normally urges catch 92 upwardly. A registering aperture 96 is formed through outer wall 24 of the valise into which catch 92 is received when the handle 30 is inserted all the way into socket 22. When it is desired to extend handle 30, 48 and support 70, 72, catch 92 is depressed below the level of wall 92, at which point the expansile tendency of spring 90 will urge support rod 72 outwardly, and acting through the connection of cable 62 will also extend handle 30, 48 out of its recesses into the position illustrated in Fig. 2, where it may freely be hand-gripped. A stop member 98 is provided on inner wall 26 to limit the extent of outward movement of handle body 60. Spring 90 is preferably heavy enough to support the weight of the valise with the rollers 72, 72 outwardly extended therefrom resting on the ground as indicated at 99.

When it is desired to use the valise in the ordinary manner, handle shaft 60 is thrust inwardly into socket 22, thereby driving cable 62 inwardly and also drawing support rod 70 inwardly against the tension of spring 90, until catch 92 slips up into aperture 96 to hold the parts in the "in" position shown in Fig. 1.

My device is simple to operate and easy to construct. Modifications may be resorted to without departing from the scope of my teachings, as socket recess 22 may be formed as a bulge on the top of the valise rather than within the margins thereof, as in Fig. 3. The sockets, passageways, handle and support rod need not be thick or bulky; and the inclusion of my device in a conventional valise does not reduce to any substantial extent its cubic capacity.

Having described my invention, what I claim and desire to secure by Letters Patent is:

1. A valise of the character described having a recess on one side thereof, an elongated recess in the opposite side thereof, an intermediate passageway between the two, a handle in one recess, a support means in the second recess, a connection between the handle and support passing through the intermediate passageway whereby movement of the handle into its recess causes movement of the support means into its recess.

2. A valise of the character described having a recess on one side thereof, an elongated recess in the opposite side thereof, an intermediate passageway between the two, a handle slidable into and out of the first recess, support means slidable into and out of the second recess, a cable connecting the handle and the support means passing through the intermediate passageway, whereby movement of the handle into its recess causes movement of the support means into its recess, and movement of the handle out of its recess causes movement of the support means out of its recess.

3. A valise as in claim 2, having means thereon to lock the handle within its recess, said lock functioning also to retain the support within its recess.

4. A valise as in claim 2, having spring means to normally urge the support out of its recess and also to normally urge the handle out of its recess.

5. A container of the character described having a recess in the top thereof, in from one side, a recess in the bottom thereof in from the other side of the bag, a connecting passageway between the two recesses through a side of the bag, a handle in the top recess having a grip portion extendable out of the recess, a support rod in the bottom recess having ground contacting means extendable out of the recess, a cable having one end secured to the inner side of the handle, and its other end secured to the inner end of the support rod, the cable passing through the connecting passageway, whereby movement of the handle into its recess causes movement of the support rod into its recess.

6. A device as in claim 5, having a normally expanding spring in the recess in the bottom of the bag, a plate in the recess, the spring being disposed between the plate and the inner end of the support rod, the spring being tensioned upon contraction thereby by movement of the support into its recess towards the plate in response to movement of the cable upon movement of the handle into its recess, the spring tension causing ejection of the support rod from the bottom recess upon release of the handle and cable at the top of the bag.

MAURICE PARTIOT.

No references cited.